(12) United States Patent
Liu (10) Patent No.: US 9,832,203 B2
(45) Date of Patent: Nov. 28, 2017

(54) APPLICATION PERMISSION MANAGEMENT DEVICE AND METHOD THEREFOR

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Xin-Long Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 207 days.

(21) Appl. No.: 14/753,929

(22) Filed: Jun. 29, 2015

(65) Prior Publication Data

US 2016/0234218 A1    Aug. 11, 2016

(30) Foreign Application Priority Data

Feb. 10, 2015  (CN) .......................... 2015 1 0068616

(51) Int. Cl.
  *G06F 7/04*  (2006.01)
  *H04L 29/06*  (2006.01)
  *H04W 4/02*  (2009.01)

(52) U.S. Cl.
  CPC ............. *H04L 63/101* (2013.01); *H04W 4/02* (2013.01)

(58) Field of Classification Search
  CPC ....... H04L 63/101; H04L 63/107; H04W 4/02
  See application file for complete search history.

(56) References Cited

U.S. PATENT DOCUMENTS

| | | | | |
|---|---|---|---|---|
| 5,778,304 A | * | 7/1998 | Grube | G01S 5/0027 455/450 |
| 6,502,022 B1 | * | 12/2002 | Chastain | G01C 21/26 701/36 |
| 7,080,402 B2 | * | 7/2006 | Bates | G06F 21/6218 380/258 |
| 7,194,278 B1 | * | 3/2007 | Cook | H04M 1/72572 455/418 |
| 7,490,763 B2 | * | 2/2009 | Keohane | G06F 11/006 235/382 |
| 7,769,394 B1 | * | 8/2010 | Zhu | H04M 1/72572 455/456.1 |
| 8,051,490 B2 | * | 11/2011 | Nomura | G06F 21/62 705/57 |

(Continued)

*Primary Examiner* — Sharon Lynch
(74) *Attorney, Agent, or Firm* — ScienBiziP, P.C.

(57) ABSTRACT

An application permission management method, includes: generating a running request in response to an operation of running an object of a terminal device, therein, the running request includes object information of the object; obtaining geographical location coordinates of the terminal device in response to the running request; determining whether the terminal device is located in one monitoring area and determine the monitoring area in which the terminal device is located; and determining forbidden lists corresponding to the determined monitoring area, determining the object according to the object information in the running request, and determining whether the object is forbidden to run according to the forbidden lists corresponding to the monitoring area.

13 Claims, 5 Drawing Sheets

(56) References Cited

U.S. PATENT DOCUMENTS

| | | | | |
|---|---|---|---|---|
| 8,468,261 | B2* | 6/2013 | Chmaytelli | G06F 21/10 709/223 |
| 8,504,120 | B2* | 8/2013 | Zhang | H04W 52/0258 455/418 |
| 9,129,450 | B2* | 9/2015 | Robertson | G07C 9/00111 |
| 9,361,741 | B2* | 6/2016 | Robertson | G07C 9/00111 |
| 9,374,654 | B2* | 6/2016 | Lindeman | H04W 4/001 |
| 9,384,654 | B1* | 7/2016 | Chillappa | G06Q 10/08 |
| 9,386,042 | B1* | 7/2016 | Stoner | G06F 17/30241 |
| 9,398,421 | B2* | 7/2016 | Guba | H04W 4/027 |
| 9,436,806 | B2* | 9/2016 | Chmaytelli | G06F 21/10 |
| 2005/0266857 | A1* | 12/2005 | Poikela | H04W 12/06 455/456.3 |
| 2008/0043689 | A1* | 2/2008 | Walter | H04W 4/02 370/338 |
| 2009/0210700 | A1* | 8/2009 | Nomura | G06F 21/62 713/155 |
| 2012/0006610 | A1* | 1/2012 | Wallace | H04M 1/67 180/272 |
| 2012/0040665 | A1* | 2/2012 | Liu | H04W 4/008 455/426.1 |
| 2012/0176232 | A1* | 7/2012 | Bantz | G07C 5/008 340/439 |
| 2012/0254382 | A1* | 10/2012 | Watson | H04W 4/021 709/221 |
| 2013/0029650 | A1* | 1/2013 | Xiao | H04W 4/027 455/417 |
| 2013/0091543 | A1* | 4/2013 | Wade | G06F 21/54 726/1 |
| 2014/0179346 | A1* | 6/2014 | Chen | H04L 67/34 455/456.1 |
| 2015/0133094 | A1* | 5/2015 | Lindeman | H04W 4/001 455/414.1 |

* cited by examiner

APPLICATION PERMISSION MANAGEMENT DEVICE AND METHOD THEREFOR

CROSS-REFERENCE TO RELATED APPLICATION

This application claims priority to Chinese Patent Application No. 201510068616.7 filed on Feb. 10, 2015, the contents of which are incorporated by reference herein.

FIELD

The subject matter herein generally relates to management systems, and particularly to an application permission management system, an application permission management device, and an application permission management method.

BACKGROUND

Portable devices, such as mobile phones and tablet computers, include more and more functions, such as a camera function, a browser function, etc. People always carry a portable device to anywhere he/she goes. However, if a place is a secret or restricted area and forbidden to do something, such as take photo, when people carrying the portable device with camera function enter the place, it is difficult to monitor the conduct of the people.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, JAVA, C, or assembly language. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

Figure 1:
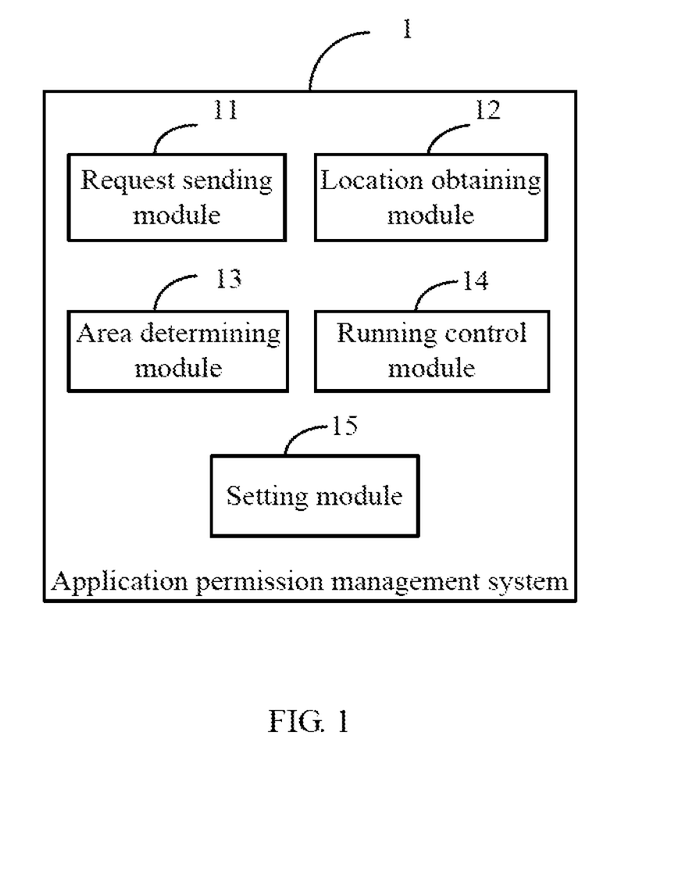
FIG. 1 is a block diagram of an application permission management system running in an application permission management device.
Figure 2:
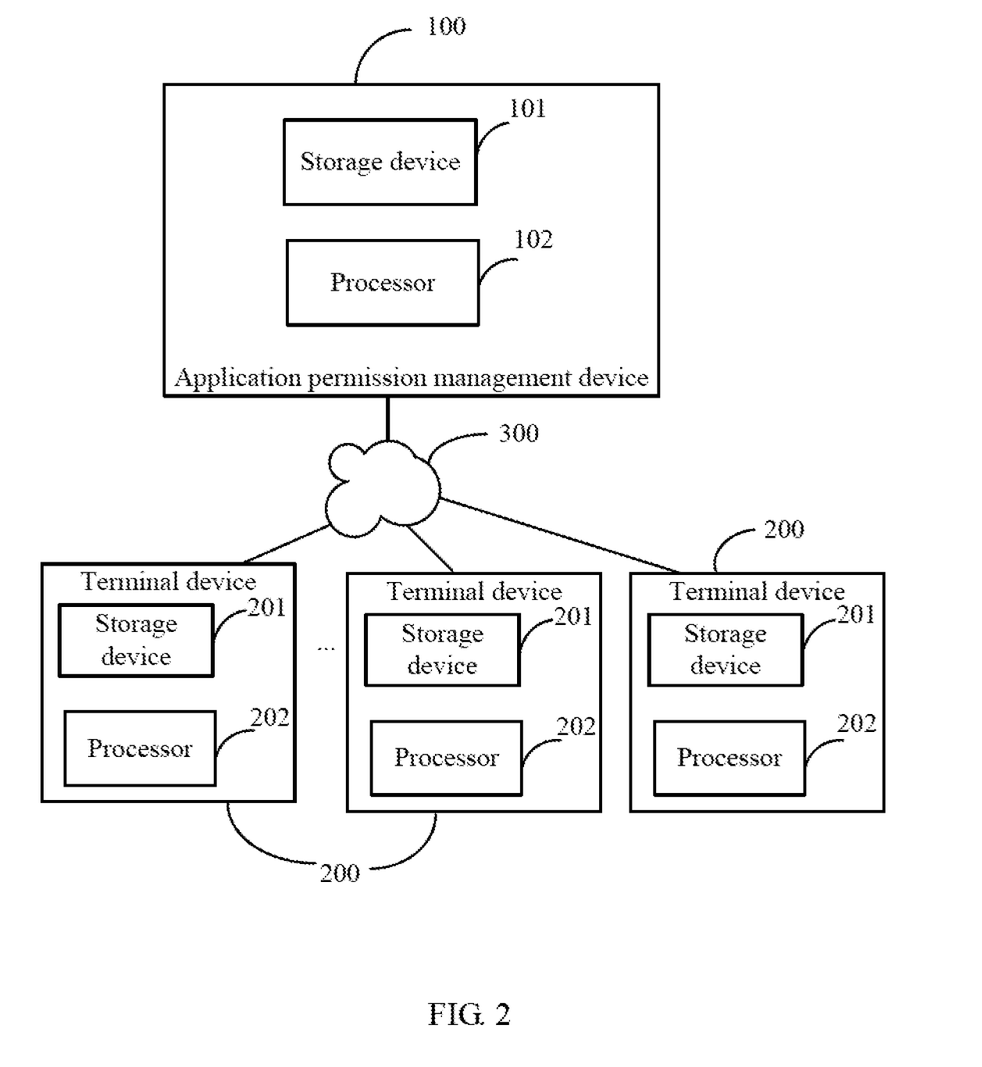
FIG. 2 is a diagrammatic view of an application permission management device and a number of terminal devices which can connect to the application permission management device.

FIGS. 1 and 2 illustrate an application permission management system 1 (shown in FIG. 1). The application permission management system 1 is run in a hardware environment including an application permission management device 100 and a number of terminal devices 200, as shown in FIG. 2. The application permission management device 100 is connected to the number of terminal devices 200 via a network 300 by wired mode or by wireless mode. The application permission management system 1 is used to manage running permissions of applications installed in the number of terminal devices 200.

The application permission management device 100 includes a storage device 101 and a processor 102. The application permission management device 100 can be a server or a server group. Each terminal device 200 includes, but is not limited to, a storage device 201 and a processor 202. The terminal devices 200 can be tablet computers, mobile phones, workstation computers, or personal computers including desktop computers and portable computers. The network 300 can be Internet, a wireless network including WIFI® and BLUETOOTH®, a telecommunication network including a general packet radio service (GPRS) network, a code division multiple access (CDMA) network, or a broadcasting network.

Figure 3:
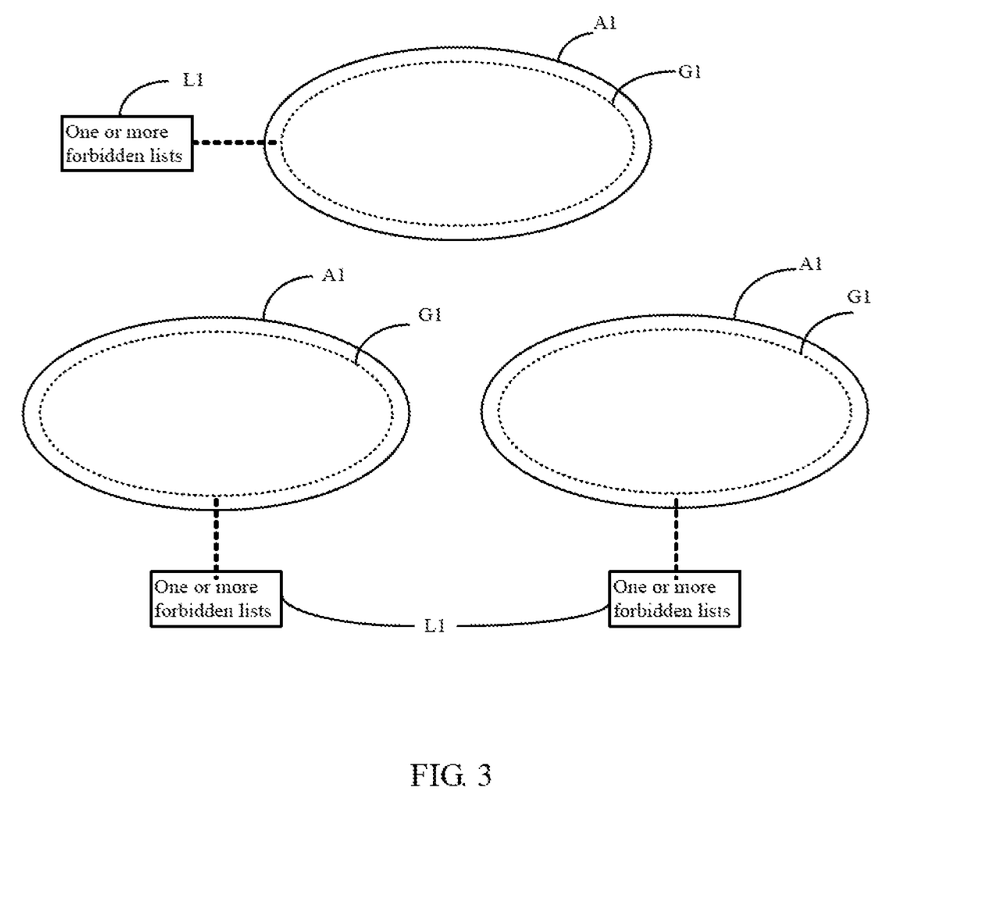
FIG. 3 is a diagrammatic view showing relationships between a number of monitoring areas, a number of location coordinate groups, and a number of forbidden lists.

Referring also to FIG. 3, the storage device 101 of the application permission management device 100 stores a number of location coordinate groups G1 and a number of forbidden lists L1. Each location coordinate group corresponds to one monitoring area A1 of a number of monitor areas A1. In the embodiment, each monitoring area A1 is an area which is restricted in terms of public access and public enjoyment. Each monitoring area A1 corresponds to one or more forbidden lists L1. Each location coordinate group G1 includes a number of sets of geographical location coordinates, and corresponds to one monitoring area A1. The forbidden lists L1 of each monitoring area A1 are pre-established according to a security requirement of each monitoring area A1, and the forbidden lists L1 of different monitoring areas A1 can be the same or can be different. The forbidden lists L1 include a list of applications which are forbidden to run, a number of lists of applications whose particular functions are forbidden to run, and a list of hardware functions which cannot operate.

The list of forbidden applications, namely the list of applications which are forbidden to run, records a number of applications which are forbidden to run in a monitoring area A1. Each list of particular forbidden functions of certain applications, namely each list of applications whose particular functions are forbidden to run, records a number of applications are permitted to run but the particular functions to be disabled. The number of lists of applications whose particular functions are forbidden to run include, among others, a list of applications whose camera function being forbidden, a list of applications whose dialing function being forbidden a list of applications whose instant messaging function being forbidden, and a list of applications whose Internet connecting or connectivity function being forbidden.

The list of forbidden hardware functions, namely the list of hardware functions which cannot operate, includes for example a microphone function.

As shown in FIG. 1, the application permission management system 1 includes a request sending module 11, a location obtaining module 12, an area determining module 13, a running control module 14, and a setting module 15.

In the embodiment, the request sending module 11 can be a collection of software instructions stored in the storage device 201 of each terminal device 200 and executed by the processor 202 of the terminal device 200. The location obtaining module 12, the area determining module 13, the running control module 14, and the setting module 15 can be collections of software instructions stored in the storage device 101 of the application permission management device 100 and executed by the processor 102 of the application permission management device 100. The modules of the application permission management system 1 also can include functionality by hardware or by integrated circuits, or as software and hardware combinations, such as a special-purpose processor or a general-purpose processor with special-purpose firmware. In one embodiment, each one of the processors 102, 202, can be a central processing unit, a digital signal processor, or a single chip, for example. In one embodiment, each one of the storage devices 101, 201 can be an internal storage system, such as a flash memory, a random access memory (RAM) for temporary storage of information, and/or a read-only memory (ROM) for permanent storage of information. Each one of the storage devices 101, 201 can also be a storage system, such as a hard disk, a storage card, or a data storage medium. Each one of the storage devices 101, 201 can include volatile and/or nonvolatile storage devices. In at least one embodiment, each one of the storage devices 101, 201 can include two or more storage devices such that one storage device is a memory and the other storage device is a hard drive. Additionally, one or more of the storage devices 101, 201 can be respectively located either entirely or partially external relative to the application permission management device 100 and the terminal device 200.

The request sending module 11 generates a running request in response to an operation of running an object of the terminal device 200 by a user. The running request includes identity information of the terminal device 200 and object information of the object. In one embodiment, the object can be an application, a function of an application, or a hardware function. The identity information of the terminal device 200 can be a hardware identification code, a telephone number, or other unique information of the terminal device 200. The object information of the object can include a name, an introduction, or other related information of the object.

The location obtaining module 12 obtains geographical location coordinates of the terminal device 200 in response to the running request. In the embodiment, the location obtaining module 12 obtains the identity information of the terminal device 200 from the running request, and determines the geographical location coordinates of the terminal device 200 according to the identity information of the terminal device 200 by using GPS technology.

The area determining module 13 is used to determine whether the terminal device 200 is located in a monitoring area A1 and determine the monitoring area A1 in which the terminal device 200 is located. In detail, the area determining module 13 compares the geographical location coordinates of the terminal device 200 to the geographical location coordinates of the location coordinate groups G1 stored in the storage device 101 and determines whether the geographical location coordinates of the terminal device 200 is within one location coordinates group G1, namely whether the geographical location coordinates of the terminal device 200 matches with one set of geographical location coordinates of one location coordinates group G1. If yes, the area determining module 13 determines that the terminal device 200 is located in the monitoring area A1 corresponding to the location coordinate group G1.

The running control module 14 is used to determine the forbidden lists L1 corresponding to the determined monitoring area A1 and also determines the object according to the object information included in the running request. The running control module 14 further determines whether the object is forbidden to run according to the forbidden lists L1 of that determined monitoring area A1. If the object is forbidden to run, the running control module 14 further forbids the terminal device 200 to run the object. If the object is not forbidden, namely the object is allowed to run, the running control module 14 does not prevent the terminal device 200 to run the object.

In one embodiment, the running control module 14 determines whether the object is listed in at least one forbidden list L1. If yes, the running control module 14 determines that the object is forbidden to run, if not, the running control module 14 determines that the object is allowed to run.

In detail, when the object is an application, the running control module 14 determines whether the object is listed in the list of applications which are forbidden to run. If the object is listed in the forbidden list of applications which are forbidden to run, the running control module 14 determines that the object is forbidden. If the object is not listed as forbidden, namely is not listed in the list of applications which are forbidden to run, the running control module 14 determines that the object should not be prevented from running For example, when the list of applications which are forbidden to run records an instant messaging application, and the object is the instant messaging application, the running control module 14 determines that such object is forbidden to run and prevents the terminal device 200 to run the object.

When the object is just a function of a particular application, the running control module 14 determines whether the object is listed in a list of applications whose particular functions are forbidden to run. If the object is listed as a forbidden function, namely the object is listed in one list of applications whose particular functions are forbidden to run, the running control module 14 determines that the object is forbidden and prevents the terminal device 200 from running the function. For example, if the object is the camera function of a short message application and such function is listed as forbidden, namely, the object is listed in one forbidden list of applications whose camera function are forbidden to run, the running control module 14 determines that the camera function of a short message application should be prevented from running When the object is a hardware function, the running control module 14 may determine whether the object is listed in the list of hardware functions which are forbidden to run. If the hardware function is listed in the list of hardware functions which are forbidden to run, the running control module 14 determines the hardware function is forbidden to run, and disables the hardware having such a function.

In one embodiment, the running control module 14 communicates with a management software (not shown) of the terminal device 200 and controls the management software to change the permission or permitted use of the application, the function of an application, or the hardware itself, to govern the use or non-use of the application, the function of an application, or the hardware itself.

Figure 4:
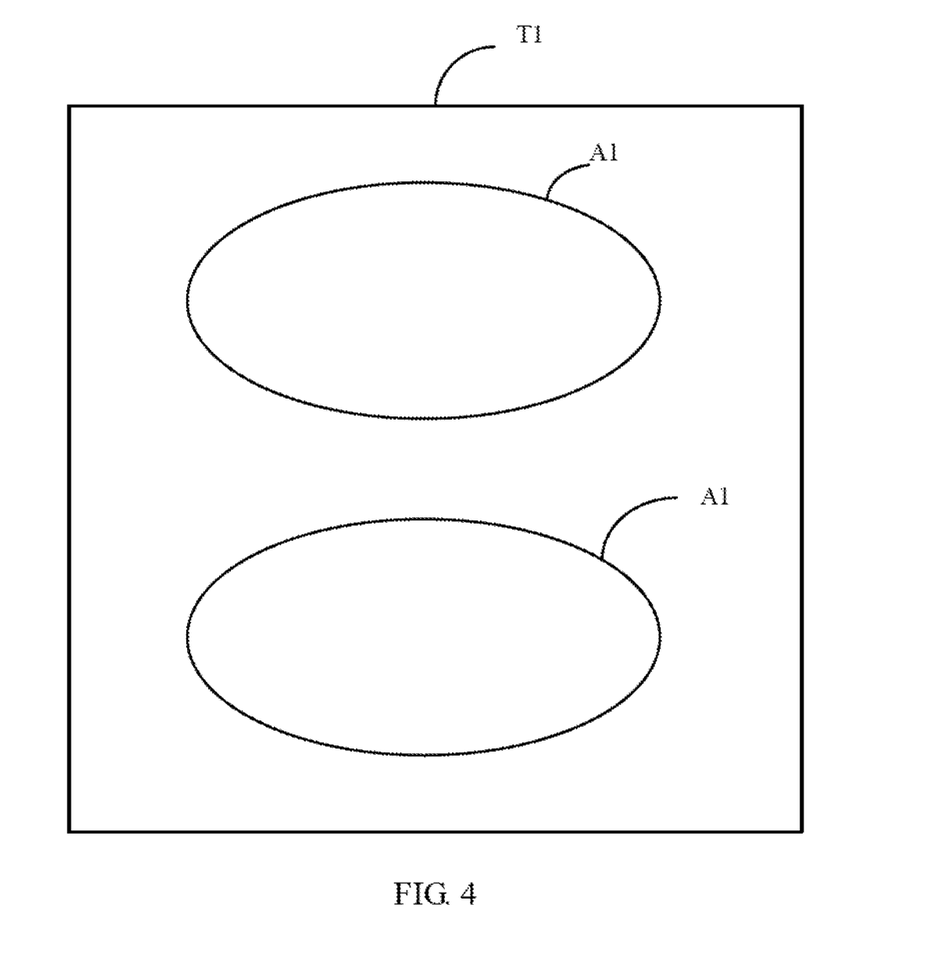
FIG. 4 is a diagrammatic view of a setting interface.

Referring also to FIG. 4, the setting module 15 provides a setting interface Ti for a user, such as an administrator of the application permission management device 100, to set the monitoring areas A1. The setting module 15 further determines the geographical location coordinates included for each set monitoring area A1 as the location coordinates group G1 corresponding to a particular monitoring area A1. In detail, in the embodiment, the setting interface T1 is a map, each point of the setting interface T1 corresponds to one set of geographical location coordinates. The setting module 15 determines the monitoring areas A1 in response to selections input to the setting interface T1. For example, the setting module 15 determines one area, circled by the user, as one monitoring area A1. The setting module 15 then determines the geographical location coordinates included in that monitoring area A1 as the location coordinate group G1, and stores the location coordinate group G1 corresponding to the monitoring area A1, to the storage device 101 of the application permission management device 100.

The setting module 15 further determines which applications and functions are forbidden to run according to each monitoring area A1, in response to a security setting operation of valid users. A valid user may be, for example, the administrator of the application permission management device 100, and forbidden lists L1 corresponding to each monitoring area A1 may thus be generated. The setting module 15 further stores the forbidden lists L1 corresponding to each monitoring area A1 to the storage device 101 of the application permission management device 100. Any one application may have a main function and several incidental functions, for example, an instant messaging application includes an instant messaging function as the main function and includes several incidental functions, such as camera function. In one embodiment, if the security setting operation for one monitoring area A1 is prohibition of photographs and of instant messaging, the setting module 15 then generates a list recording the applications with camera or instant messaging as the main functions as the list of applications which are forbidden to run, and also a list recording applications with camera or instant messaging as the incidental functions as the list of applications whose camera function are forbidden to run or the list of applications whose instant messaging function are forbidden to run.

In one embodiment, the setting module 15 obtains all applications issued by an application store, such as an Android market, and adds the obtained applications to different forbidden lists according to the main function and incidental functions included in such applications.

Therefore, the setting module 15 generates the number of location coordinates groups to respectively corresponding to the number of monitoring areas A1 and identical or differing forbidden lists to be associated with each monitoring area A1, and stores the generated location coordinates groups and forbidden lists to the storage device 101.

In one embodiment, the storage device 101 further stores a list of applications which are forbidden to run in non-monitored areas. Such a list shows applications which are forbidden to run outside any monitoring area A1. In the embodiment, applications which are forbidden outside any non-monitored area can be the applications developed by a company, and are limited to be used inside of the company. In the embodiment, such a list is generated by the setting module 15 in response to user operation, such as the operation of the administrator of the company.

In one embodiment, when the area determining module 13 determines that the terminal device 200 is not located in any monitoring area A1 and the running control module 14 determines that the object is an application, the running control module 14 further determines whether the object is listed in the of applications which are forbidden to run in non-monitored areas. If the object is listed in the list of applications which are forbidden to run in non-monitored areas, the running control module 14 prevents the terminal device 200 from running the object.

In one applicable environment, the application permission management device 100 can be a server of a company, and the users of the terminal devices 200 can be the staff or other employees of the company. The company can require all staff to register his/her terminal device 200 in the application permission management device 100, and the request sending module 11 can be a program package. After the terminal devices 200 are registered in the application permission management device 100, the application permission management device 100 can send the request sending module 11 to the all of terminal devices 200. The request sending module 11 can be an self-starting program package when any object, such as an application, a function of an application, or a hardware function is requested to run by the terminal devices 200. In another embodiment, the location obtaining module 12, the area determining module 13, and the running control module 14 can all be program packages, and the application permission management device 100 can send the location obtaining module 12, the area determining module 13, and the running control module 14 to the all terminal devices 200 after the terminal devices 200 are registered in the application permission management device 100.

Figure 5:
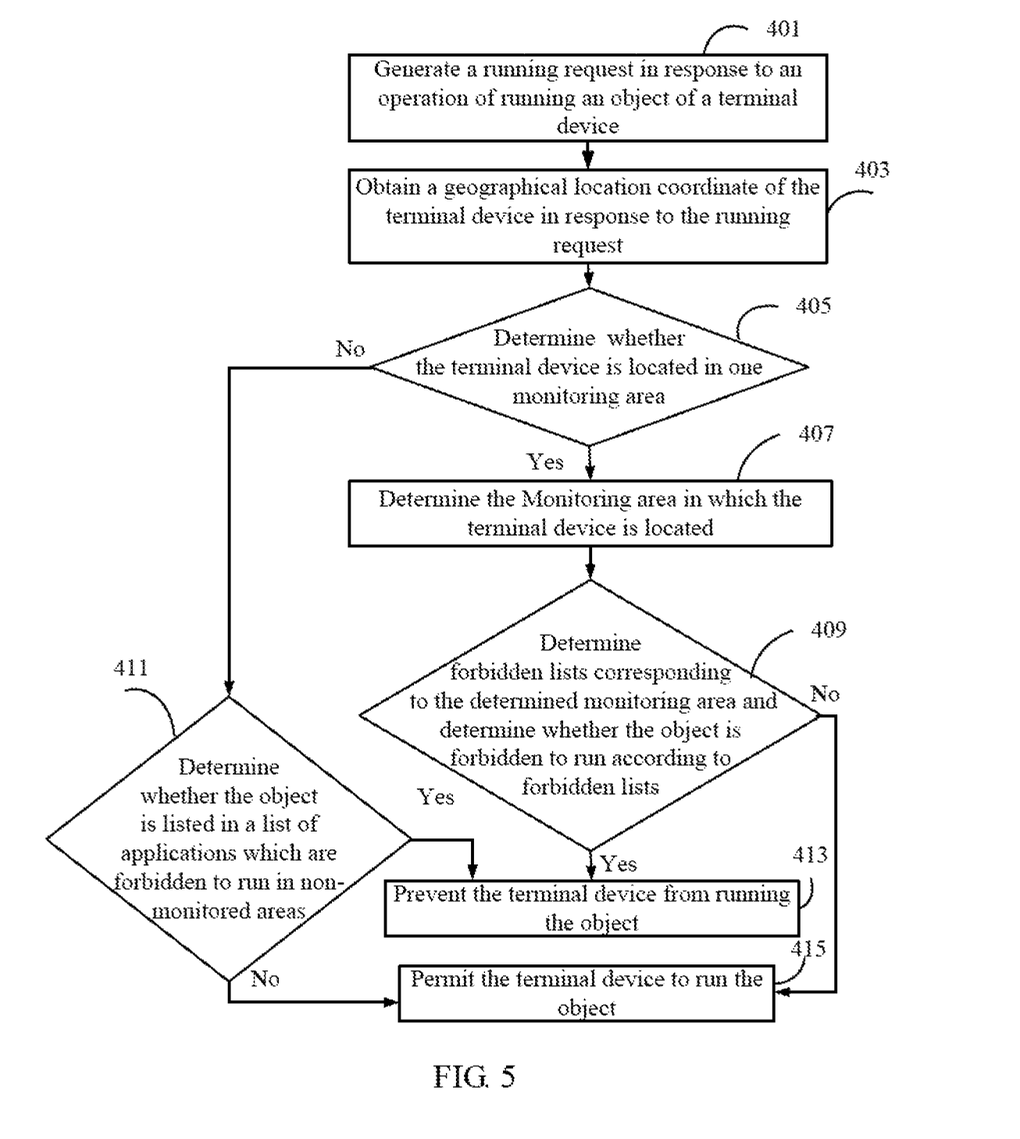
FIG. 5 is a flowchart illustrating an application permission management method.

FIG. 5 illustrates a flowchart of an application permission management method. The method is provided by way of example, as there are a variety of ways to carry out the method. The method described below can be carried out using the configurations illustrated in FIGS. 1 and 2, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed.

Additional blocks may be added or fewer blocks may be utilized, without departing from this disclosure. The example method can begin at block 401.

At block 401, a request sending module generates a running request in response to an operation of running an object of a terminal device, the running request includes identity information of the terminal device and object information of the object. In one embodiment, the object can be an application, a function of an application, or a hardware function.

At block 403, a location obtaining module obtains geographical location coordinates of the terminal device in response to the running request. In the embodiment, the location obtaining module obtains the identity information of the terminal device from the running request, and determines the geographical location coordinate of the terminal device according to the identity information of the terminal device by using a GPS technology.

At block 405, an area determining module determines whether the terminal device is located in a monitoring area. If yes, the process goes to block 407, if not, the process goes to block 411. In detail, the area determining module compares the geographical location coordinates of the terminal device to geographical location coordinates of a number of location coordinate groups, compares whether the geographical location coordinate of the terminal device is within one location coordinate group to determine whether the terminal device is located in a monitoring area.

At block 407, the area determining module determines the monitoring area in which the terminal device is located. In detail, the area determining module determines the terminal device is located in the monitoring area corresponding to the location coordinate group with the same geographical location coordinates as that of the terminal device.

At block 409, a running control module determines forbidden lists corresponding to the determined monitoring area, determines the object according to the object information included in the running request, and determines whether the object is forbidden to run according to the forbidden lists corresponding to the monitoring area. If yes, the process goes to block 413, if not, the process goes to block 415. In detail, the running control module determines whether the object is listed in one forbidden list, if yes, the running control module determines the object is forbidden to run, if not, the running control module determines the object is allowed to run.

At block 411, the running control module determines whether the object is listed in a list of applications which are forbidden to run in non-monitored areas, when determining the object is an application. If yes, the process goes to block 413, if not, the process goes to block 415.

At block 413, the running control module prevents the terminal device from running the object of the terminal device.

At block 415, the running control module permits the terminal device to run the object of the terminal device.

In one embodiment, the method further includes steps: a setting module provides a setting interface for a user to set the monitoring areas; and determines the geographical location coordinates included in each set monitoring area as the location coordinate group corresponding to the monitoring area.

In one embodiment, the method further includes steps: the setting module further determines which applications and functions are forbidden to run, in each monitoring area, in response to a security setting operation of a valid user, thus generating the forbidden lists corresponding to each monitoring area.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An application permission management device comprising:
    a storage device storing a plurality of location coordinate groups, a plurality of forbidden lists, and a plurality of modules which are collections of instructions, wherein each location coordinate group corresponds to one of a plurality of monitoring areas, and each monitoring area of the monitoring areas corresponds to one or more forbidden lists; and
    at least one processor and memory configured to execute the plurality of modules, the plurality of modules comprising:
        a request sending module configured to, upon execution by the at least one processor, cause the at least one processor to generate a running request in response to an operation of running an object of a terminal device, wherein, the running request comprises object information of the object;
        a location obtaining module configured to, upon execution by the at least one processor, cause the at least one processor to obtain geographical location coordinates of the terminal device in response to the running request;
        an area determining module configured to, upon execution by the at least one processor, cause the at least one processor to determine whether the terminal device is located in one monitoring area and determine the monitoring area in which the terminal device is located;
        a running control module configured to, upon execution by the at least one processor, cause the at least one processor to determine forbidden lists corresponding to the determined monitoring area, identify the object according to the object information comprised in the running request, and determine whether the object is forbidden to run according to the forbidden lists corresponding to the monitoring area;
        wherein when the object is a hardware function, the running control module determines whether the hardware function is listed in a list of hardware functions which are forbidden to run and when the hardware function is listed in the forbidden list recording hardware functions which are forbidden to run, the running control module determines the hardware function is forbidden to run and prevents the terminal device from running the hardware function, and
        a setting module configured to, upon execution by the at least one processor, cause the at least one processor to provide a setting interface for a valid user to set the monitoring areas, wherein the settings interface is a map, each point of the setting interface corresponds to one set of geographical location coordinates, the setting module is further configured to determine the monitoring areas in response to circled selections input to the setting interface, and determine geographical location coordinates comprised in each set monitoring area as the location coordinate groups corresponding to different monitoring areas.

2. The device according to claim 1, wherein when the running control module determines the object is listed in one forbidden list, the running control module determines the object is forbidden to run; when the running control module determines the object is not listed in any forbidden list, the running control module determines the object is allowed to run.

3. The device according to claim 2, wherein the running request further comprises identity information of the terminal device, the location obtaining module obtains the identity information of the terminal device from the running request, and determines the geographical location coordinate of the terminal device according to the identity information of the terminal device by using GPS technology; the area determining module compares the geographical location coordinates of the terminal device to geographical location coordinates of location coordinate groups corresponding to different monitoring areas, and determines whether the geographical location coordinates of the terminal device is within one location coordinate group to determine whether the terminal device is located in the one monitoring area and determine the monitoring area in which the terminal device is located.

4. The device according to claim 1, wherein the setting module further configured to, upon execution by the at least one processor, cause the at least one processor to determine which applications and functions are forbidden to run, in each monitoring area, in response to a security setting operation of the valid user, thus generating the forbidden lists corresponding to each monitoring area.

5. The device according to claim 2,
wherein when the object is an application, the running control module determines whether the object is listed in a list of applications which are forbidden to run, when the object is listed in the list of applications which are forbidden to run, the running control module determines the application is forbidden to run and prevents the terminal device from running the application; and
when the object is a function of an application, the running control module determines whether the object is listed in a list of applications whose particular functions are forbidden to run, when the function of the application is listed in the forbidden list of applications whose particular functions are forbidden to run, the running control module determines the function of the application is forbidden to run, and prevents the terminal device from running the function of the application.

6. The device according to claim 2, wherein when the area determining module determines the terminal device is not located in any monitoring areas and the running control module determines the object is an application, the running control module further determines whether the object is listed in a list of applications which are forbidden to run in non-monitored areas, when the application is listed in the list of applications which are forbidden to run in non-monitored areas, the running control module further prevents the terminal device from running the application.

7. An application permission management method, applied in an application permission management device and a plurality of terminal devices, the method comprising:
generating a running request in response to an operation of running an object of a terminal device, wherein, the running request comprises object information of the object;
obtaining geographical location coordinates of the terminal device in response to the running request;
determining whether the terminal device is located in one monitoring area and determining the monitoring area in which the terminal device is located; and
determining forbidden lists corresponding to the determined monitoring area, identifying the object according to the object information comprised in the running request, and determining whether the object is forbidden to run according to the forbidden lists corresponding to the monitoring area;
determining when the object is a hardware function whether the hardware function is listed in a list of hardware functions which are forbidden to run when the object is a hardware function, and determining the hardware function is forbidden to run, when the hardware function is listed in the forbidden list recording hardware functions which are forbidden to run;
providing a setting interface for a valid user to set monitoring areas, wherein the setting interface is a map, each point of the setting interface corresponds to one geographical location coordinate; and
determining the monitoring areas in response to circled selections input to the setting interface, and determining geographical location coordinates comprised in each set monitoring area as location coordinate groups corresponding to different monitoring areas.

8. The method according to claim 7, wherein the step of determining whether the object is forbidden to run according to the forbidden lists corresponding to the monitoring area comprising:
determining the object is forbidden to run when the object is listed in one forbidden list; and
determining the object is allowed to run when the object is not listed in any forbidden list.

9. The method according to claim 8, wherein the running request further comprises identity information of the terminal device, the step of obtaining geographical location coordinates of the terminal device in response to the running request comprising:
obtaining the identity information of the terminal device from the running request; and
determining the geographical location coordinates of the terminal device according to the identity information of the terminal device by using GPS technology.

10. The method according to claim 9, wherein the step of determining whether the terminal device is located in one monitoring area and determining the monitoring area in which the terminal device is located comprising:
comparing the geographical location coordinates of the terminal device to geographical location coordinates of location coordinate groups corresponding to different monitoring areas; and
determining whether the geographical location coordinate of the terminal device is within one location coordinate group to determine whether the terminal device is located in the one monitoring area and determine the monitoring area in which the terminal device is located.

11. The method according to claim 7, further comprising:
determining which applications and functions are forbidden to run, in each monitoring area, in response to a security setting operation of the valid user, thus generating the forbidden lists corresponding to each monitoring area.

12. The method according to claim 8, wherein the step of determining the object is forbidden to run when the object is listed in one forbidden list comprises:
determining whether the object is listed in a list of applications which are forbidden to run when the object is an application, and determining the application is forbidden to run when the object is listed in the list of applications which are forbidden to run; and
determining whether the object is listed in a list of applications whose particular functions are forbidden to run when the object is a function of an application, and determining the function of the application is forbidden to run when the function of the application is listed in the forbidden list of applications whose particular functions are forbidden to run.

13. The method according to claim 8, further comprising:
determining whether the object is listed in a list of applications which are forbidden to run in non-monitored areas, when the terminal device is not located in any monitoring areas and the object is an application; and preventing the terminal device from running the object when the object is listed in the list of applications which are forbidden to run in non-monitored areas.

* * * * *